W. WENZEL.
APPARATUS FOR PASTEURIZING AND COOLING BEER.
APPLICATION FILED JULY 8, 1908.
934,377.
Patented Sept. 14, 1909.
3 SHEETS—SHEET 3.
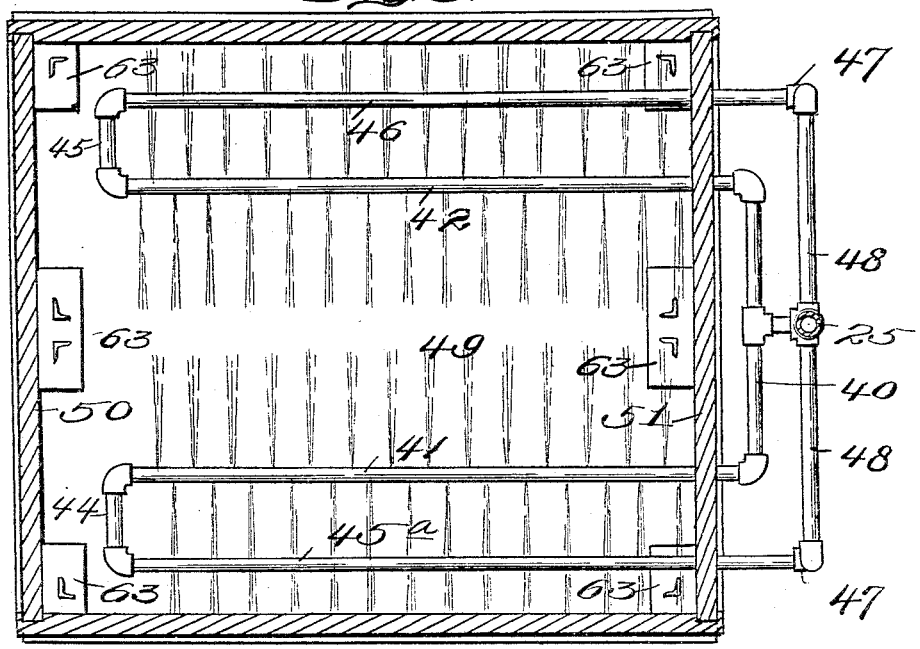
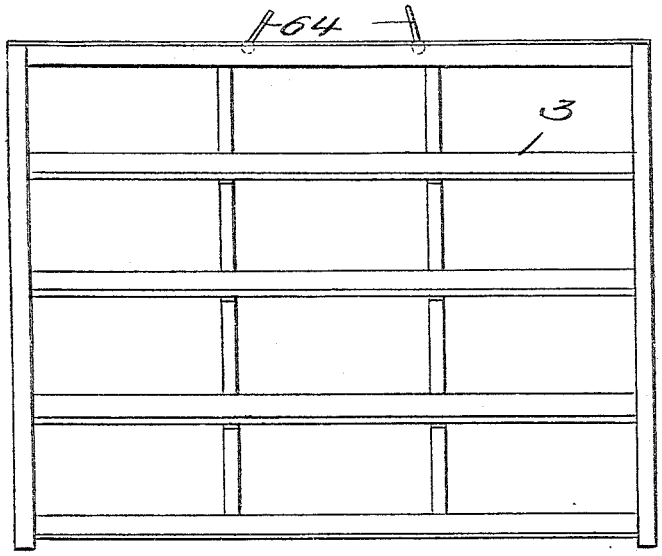
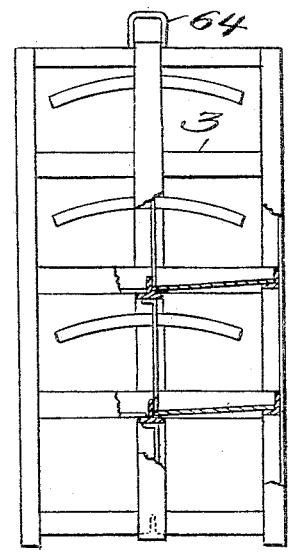
Witnesses
C. D. Kesler
Robert Everitt
Inventor
William Wenzel
By James L. Norris
Atty

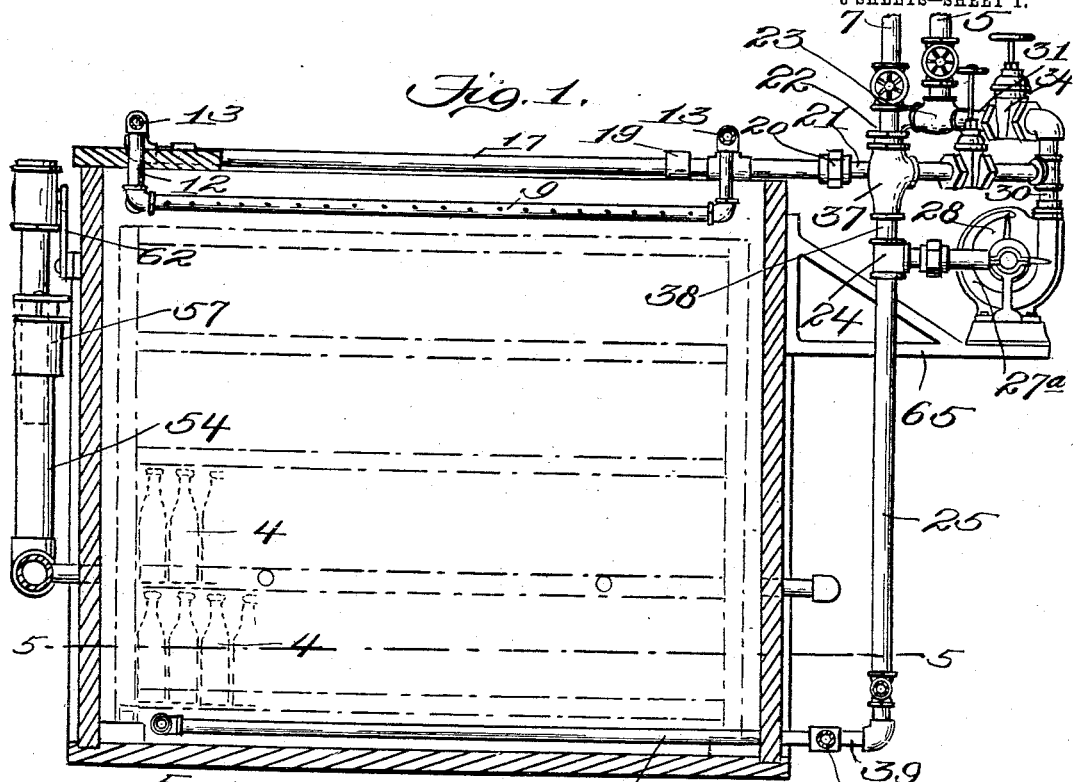

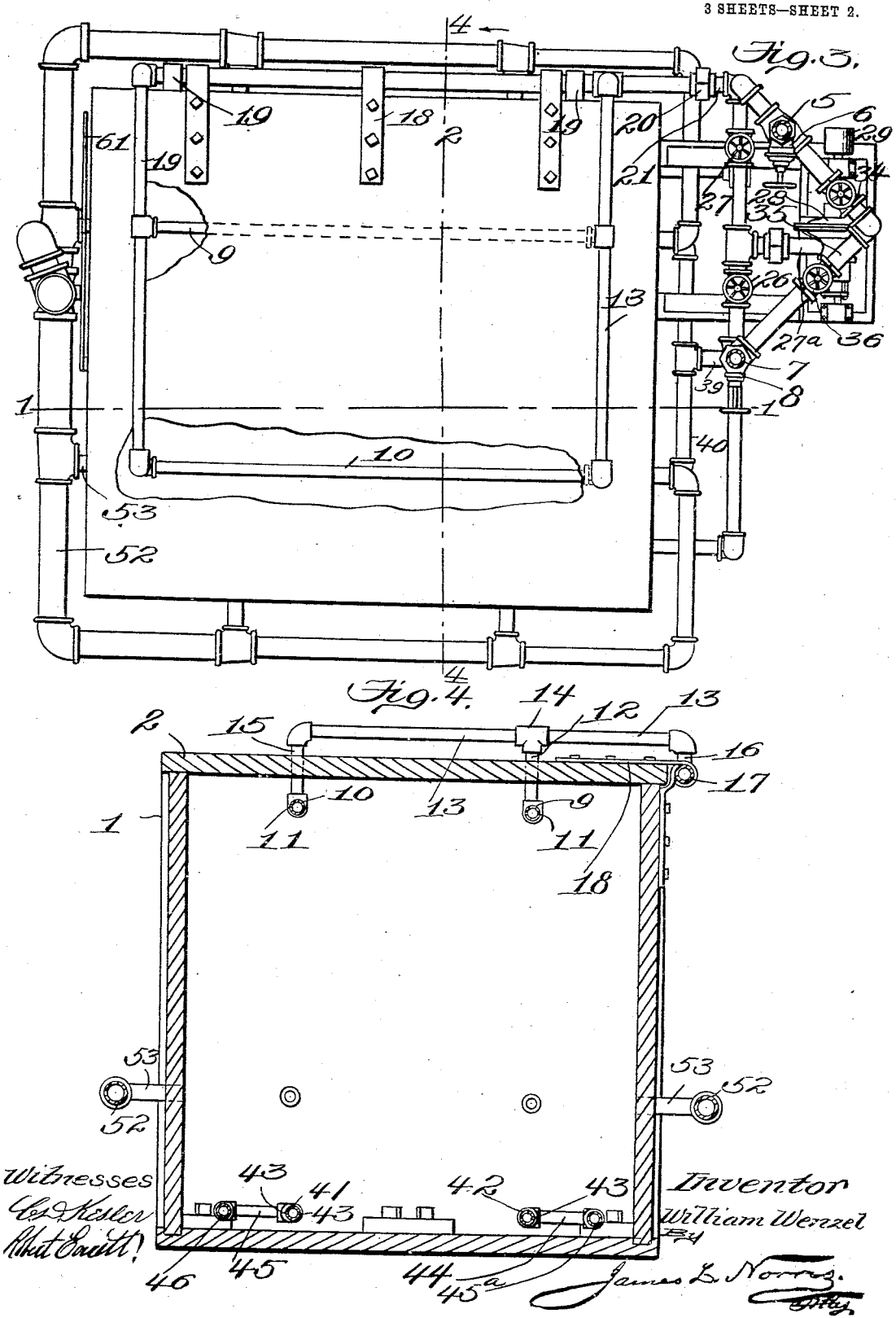

UNITED STATES PATENT OFFICE.

WILLIAM WENZEL, OF APPLETON, WISCONSIN.

APPARATUS FOR PASTEURIZING AND COOLING BEER.

934,377.   Specification of Letters Patent.   Patented Sept. 14, 1909.

Application filed July 8, 1908. Serial No. 442,430.

*To all whom it may concern:*

Be it known that I, WILLIAM WENZEL, a citizen of the United States, residing at Appleton, in the county of Outagamie and State of Wisconsin, have invented new and useful Improvements in Apparatus for Pasteurizing and Cooling Beer, of which the following is a specification.

This invention relates to an apparatus for pasteurizing and cooling beer in bottles and aims to provide an apparatus of such class with means in a manner as hereinafter set forth whereby the beer in the bottles will be subjected to a circulating medium of progressively increasing temperature until the desired temperature is reached, then maintaining such circulating medium at such temperature a predetermined period of time until the pasteurization is completed, after which the pasteurized beer is cooled by subjecting it to a circulating medium of gradually decreasing temperature until the cooling step is completed.

Further objects of the invention are to provide an apparatus of the class referred to which shall be simple in its construction, strong, durable, efficient in its use, conveniently operated, readily set up, and comparatively inexpensive to manufacture.

With the foregoing and other objects in view the invention consists of the novel construction, combination and arrangement of parts hereinafter more specifically described and illustrated in the accompanying drawings wherein is shown the preferred embodiment of the invention, but it is to be understood that changes, variations and modifications can be resorted to which come within the scope of the claims hereunto appended.

In the drawings:—Figure 1 is a longitudinal sectional view of a pasteurizing apparatus in accordance with this invention, the section being taken on the line 1—1 of Fig. 3. Fig. 2 is an end view in elevation. Fig. 3 is a plan broken away. Fig. 4 is a transverse section on the line 4—4 of Fig. 3. Fig. 5 is a sectional plan on the line 5—5 of Fig. 1, and Figs. 6 and 7 are respectively a side elevation and an end view partly in section of a convenient form of crate or basket for supporting the bottles containing the beer within the apparatus.

Referring to the drawings by reference characters, 1 denotes a tank having a hinged top 2 and in which is adapted to be mounted a basket 3 carrying bottles 4 containing the liquid to be pasteurized. The pasteurizing medium is water having the temperature thereof progressively increasing, while the cooling medium is water having the temperature thereof gradually decreasing. The reference character 5 denotes a water feed pipe communicating with a water supply and provided with a cut-off 6. The reference character 7 denotes a steam feed pipe communicating with the steam supply and formed with a cut-off 8. Arranged within the tank 1 at the top thereof is a plurality of combined water supply and draw-off pipes 9, 10 each of which is formed with a series of orifices 11 for supplying or withdrawing the water from the top of the tank. The pipe 9 at each end is bent in a vertical manner as at 12 and the up-turned ends 12 of the said pipe 9 are connected to the transversely extending branch pipes 13 by the T-couplings 14. The branch pipes 13 at one end each depend downwardly as at 15 and the said depending ends 15 terminate in a pipe 10. The other end of each of the pipes 13 is bent downwardly as at 16 and terminates in a longitudinally extending conducting pipe 17. The latter is connected to the straps 18 which are fixed to the cover 2 and constitutes the pivot for the cover 2. Stops or collars 19 are carried by the cover 2 in which the pipe 17 pivots and the pipe 17 is swivelly connected as at 20 to a branch pipe 21 and by such an arrangement the raising and lowering of the cover 2 can be had when occasion so requires. The depending portions 15 of the pipe 13 extend through the cover 2 and the upwardly extending portions 12 of the pipe 9 project through the cover 2. By such an arrangement when the cover 2 is raised the pipes 9, 10 and 13 are carried therewith and a like action is had when the cover 2 is lowered. The branch pipe 21 communicates with a coupling pipe 22. The latter opens at one end into a coupling 23 which communicates with the water feed pipe 5 and at its other end opens into a coupling 24 which communicates with a vertically extending conducting pipe 25. The pipe 22 embodies a vertically extending portion and an upper and a lower angularly disposed portion, the upper portion extending at an angle with respect to the lower portion and said lower portion is of greater length than said upper portion and is provided with the cut-offs 26, 27. Intermediate the lower portion of the pipe 22 a suction pipe 27ᵃ communicates therewith and with a pump 28 driven by a pulley 29 connected with the prime mover, not shown.

The outlet pipe for the pump 28 is indicated by the reference character 30 which communicates with a branch pipe 31 projecting from the coupling 23 and having a cut-off 34. A branch pipe 35 having a cut-off 36 communicates at one end with the outlet pipe 30 and with a coupling 37 in which opens the feed steam pipe. A branch pipe 38 opens at one end into the coupling 37 and at its upper end in the coupling 24. The conducting pipe 25 which communicates with the coupling 24 has its lower end as at 39 bent in an angular manner and opens into a transversely extending branch pipe 40 which terminates at each end in a longitudinally extending combined water supply and draw-off pipe. These pipes are indicated by the reference characters 41 and 42 and each provided with a series of orifices 43. Each of the pipes 41, 42 terminates at its inner end in a transversely extending branch pipe. These branch pipes are indicated by the reference characters 44, 45, each of which opens into a longitudinally extending combined water supply and draw-off pipe. These latter pipes are indicated by the reference characters 45ᵃ, 46 and are positioned in parallelism with respect to the pipes 41, 42. The pipes 45ᵃ, 46 at their outer ends are bent outwardly as at 47 and each of said bent ends 47 opens into a branch pipe 48 and these pipes 48 communicate with the conducting pipe 25.

The pipes 41, 42 and 45ᵃ, 46 are arranged in close proximity to the bottom 49 of the tank 1, and terminate at one end at a point removed from the side wall 50 of the tank 1 and at their other ends extend through the side wall 51 of the tank 1. The branch pipes 40, 48 are arranged exteriorly of the wall 51 and the same is true of the conducting pipe 25.

Surrounding the tank 1 exteriorly thereof is a conducting pipe 52 for the over-flow and which communicates with the interior of the tank 1 through the medium of a series of outlet pipes 53, these latter extending and opening into the tank 1 at a point below the center thereof. The pipe 52 is common to all the outlet pipes 53 and opens into a stand pipe formed of a stationary section 54 and a shiftable section 55. The latter has communicating with the top thereof a discharge pipe 56. The section 54 of the stand pipe is provided with a packing box 57 in which is arranged a gland 58. Through the latter extends the section 55. The section 55 is vertically adjusted through the medium of the lever 59 pivoted to the wall 50 as at 60 provided with a handle 61 and connected to the section 55 by the link 62. By providing an adjustable stand pipe it is evident that the depth of the body of water within the tank 1 can be regulated. The stand pipe and its connections constitute what may be termed a water gage.

The crates, racks or receptacles 3 are mounted upon the supports 63 and provided with a bail 64 whereby the crate, rack or receptacle can be removed and positioned in the tank 1 when occasion so requires. The pump 28 is mounted upon a laterally extending bracket 65 which projects from and is secured to the wall 51.

The pipes 9, 10 are positioned the desired distance apart so that the water will be drawn from or discharged at different points at the top of the tank and the same is true of the pipes 41, 42. This arrangement of perforated pipes facilitates the circulation of the pasteurizing medium which by way of example is heated water and the cooling medium which by way of example is water gradually decreasing in temperature.

The operation of the apparatus is as follows:—It will be stated that after the crates or receptacles containing the bottles filled with beer are positioned in the tank, the tank is completely filled with water of suitable temperature through the medium of the pipes 5, 22, 17 and 13 and 9 and 10. During the filling of the tank with water, the cut-offs 27 and 34 are closed. It will be assumed that the tank has been filled with water, the cut-off 6 is then closed, the cut-off 27 opened, the cut-off 34 remaining closed, the cut-off 36 opened and the cut-off 8 opened, whereby steam is admitted to the conducting pipe 25. The pump 28 is operated and by such action water is drawn from the top of the body of water within the tank 1. The water passes from the tank 1 out through the pipes 9, 10, 13, 17, 21, 27ᵃ, through the pump, pipes 30, 35, into the branch pipe 38. At this point the steam entering the branch 38 will increase the temperature of the water. The heated water is conducted through the pipe 25 and discharged into the bottom of the tank through the medium of the pipes 41, 42, and the connections between said pipes and the conducting pipe 25. This forced mechanical circulation, i. e. drawing the water from the top and reëntering it into the tank at the bottom will cause the water to have the temperature progressively increased, owing to the supply of steam to the branch 38. After the water has been heated to a desired temperature, it is maintained at such a temperature for a predetermined period to complete the pasteurization of the beer and when it has been determined that the pasteurization has been completed, or at any time as may be desired the steam supply is shut off by closing the cut-off 8. The cut-offs 27 and 36 are also closed and the cut-offs 26, 34 and 6 opened, the operation of the pump is reversed and the water is drawn from the bottom of the tank and reëntered into the tank at the top, the water passing out through the pipes 41, 42, and the connections therebetween and the conducting pipe 25. From there the water passes through the lower portion of the pipe 22 and into the pump, then up through the pipe 30 into the branch 31 where it is admixed with the cold water entering through the pipe 5, consequently decreasing the temperature of the water drawn from the bottom of the tank 1. From the branch 31, the water passes into the vertical portion of the pipe 22, thence into the pipe 17, from there into the pipes 13, and discharged in the tank through the perforated pipes 9, 10. This action is continued until the cooling operation has been completed. The circulation of water in the manner as stated will cause the water to assume a gradually decreasing temperature on its way from the bottom to the top of the tank, owing to the admixing with the water of the cold water entering through the pipe 5. The overflow is discharged through the outlets 53, common conducting pipe 52, the stand pipe which communicates with the pipe 52 and the discharge pipe 56. After the cooling operation has been completed, the crate or receptacle with the bottles of beer which have been operated on are removed in a known manner from the tank and another lot of bottles containing beer placed in the tank to be pasteurized and cooled.

The overflow of the cooling medium and heating medium is provided for by the manner in which the outlet pipes 53 communicate with the interior of the tank and also with the common conducting pipe 52, the latter opening into the stand pipe. The level of the water within the tank can be regulated owing to the adjustability of the stand pipe, as will be evident, or in other words the adjustability of the stand pipe provides for regulation of the discharge from the tank.

By setting up the apparatus in the manner as hereinbefore described, it will be evident that the suction of the pump through the perforated pipes taking the water from all parts of the tank and after heating it forcing it into the bottom embodies several distinct principles, first, circulation by suction at the top, thereby also lifting the entering heated water from the bottom, second, the natural circulation caused by the rising of the heated water, and third the circulation by forcing the heated water into the tank by the pump which is aided by the rising of the heated water and the lifting of the heated water by suction. In reference to the cooling, it will be said that the hot water is drawn from all parts of the bottom of the tank and forced into the top of the tank through the perforated pipes, the heated water prior to its entering the top of the tank being mixed with cold water and as the cold water is heavier than the hot water, it naturally gravitates to the bottom. By the arrangement of perforated pipes, each is supplied from both ends, giving an equal distribution of water throughout the tank and also drawing from all parts of the tank. In causing the over-flow water to waste at the sides of the tank at or near the center lines of the sides and ends, three distinct means of circulation during the cooling process are obtained, first, circulation caused by the natural gravitation of the cold water to the bottom of the tank, second, circulation caused by wasting the over-flow water at the sides and ends which aids in the gravitation of the cold water to the bottom of the tank, and third, circulation caused by suction at the bottom of the tank, all of which tends to cause a rapid, uniform, thorough and complete gradual cooling of the water in all parts of the tank.

By setting up the apparatus in the manner as hereinbefore set forth a uniform circulation of the water into which the bottles containing the beer are submerged is obtained, whereby the beer will be subjected to uniform temperatures gradually increasing when pasteurizing and gradually decreasing when cooling, thereby giving each bottle containing beer no matter where placed the same treatment.

What I claim is:—

1. An apparatus for pasteurizing and cooling beer comprising a tank adapted to contain a body of water in which bottles containing beer are immersed, means whereby the water can be drawn from the top and forced into the bottom of the tank and withdrawn from the bottom and forced into the top of the tank, means for admixing a heating medium with the water to gradually increase its temperature during its travel from the top to the bottom of the tank, and means for admixing a cooling medium with the water during its travel from the bottom to the top of the tank.

2. An apparatus for pasteurizing and cooling beer comprising a tank adapted to contain a body of water in which bottles containing beer are immersed, means whereby the water can be drawn from the top and forced into the bottom of the tank and withdrawn from the bottom and forced into the top of the tank, means for admixing a heating medium with the water to gradually increase its temperature during its travel from the top to the bottom of the tank, means for admixing a cooling medium with the water during its travel from the bottom to the top of the tank, and means for discharging the surplus water from the tank.

3. An apparatus for pasteurizing and cooling beer comprising a tank adapted to contain a body of water in which bottles containing beer are immersed, means whereby the water can be drawn from the top and forced into the bottom of the tank and withdrawn from the bottom and forced into the top of the tank, means for admixing a heating medium with the water to gradually increase its temperature during its travel from the top to the bottom of the tank, means for admixing a cooling medium with the water during its travel from the bottom to the top of the tank, and a regulatable means for discharging the surplus water from the tank.

4. An apparatus for pasteurizing and cooling beer comprising a tank adapted to contain a body of water in which bottles containing beer are immersed, means whereby the water can be drawn from the top and forced into the bottom of the tank and withdrawn from the bottom and forced into the top of the tank, means for admixing a heating medium with the water to gradually increase its temperature during its travel from the top to the bottom of the tank, means for admixing a cooling medium with the water during its travel from the bottom to the top of the tank, and means opening into the tank at the sides thereof at a point between the center and the bottom of the tank for discharging the surplus water.

5. An apparatus for pasteurizing and cooling beer comprising a tank adapted to contain a body of water in which bottles containing beer are immersed, means whereby the water can be drawn from the top and forced into the bottom of the tank and withdrawn from the bottom and forced into the top of the tank, means for admixing a heating medium with the water to gradually increase its temperature during its travel from the top to the bottom of the tank, means for admixing a cooling medium with the water during its travel from the bottom to the top of the tank, and regulatable means opening into the tank at the sides thereof at a point between the center and the bottom of the tank for discharging the surplus water.

6. An apparatus for pasteurizing and cooling beer in bottles comprising a tank adapted to contain a body of water in which the bottles containing the beer are submerged, a plurality of combined perforated supply and draw-off pipes arranged in said tank in proximity to the bottom thereof, a plurality of combined perforated supply and draw-off pipes arranged in said tank in proximity to the top thereof, means communicating with said pipes for drawing off the water at the top and reëntering it at the bottom of the tank whereby a circulation of the water is had in one direction and for drawing off the water at the bottom and reëntering it at the top whereby the circulation of the water is had in the opposite direction, means for admixing a heating medium with the water while circulating in one direction whereby the temperature of the water is progressively increased, and means for admixing a cooling medium with the water as it is circulating in the opposite direction whereby the temperature of the water is gradually decreased.

7. An apparatus for pasteurizing and cooling beer in bottles comprising a tank adapted to contain a body of water in which the bottles containing the beer are submerged, a plurality of combined perforated supply and draw-off pipes arranged in said tank in proximity to the bottom thereof, a plurality of combined perforated supply and draw-off pipes arranged in said tank in proximity to the top thereof, means communicating with said pipes for drawing off the water at the top and reëntering it at the bottom of the tank whereby a circulation of the water is had in one direction and for drawing off the water at the bottom and reëntering it at the top whereby the circulation of the water is had in the opposite direction, means for admixing a heating medium with the water while circulating in one direction whereby the temperature of the water is progressively increased, means for admixing a cooling medium with the water as it is circulating in the opposite direction whereby the temperature of the water is gradually decreased, and means at the sides and ends of the tank for drawing off the surplus water.

8. An apparatus for pasteurizing and cooling beer in bottles comprising a tank adapted to contain a body of water in which the bottles containing the beer are submerged, a plurality of combined perforated supply and draw-off pipes arranged in said tank in proximity to the bottom thereof, a plurality of combined perforated supply and draw-off pipes arranged in said tank in proximity to the top thereof, means communicating with said pipes for drawing off the water at the top and reëntering it at the bottom of the tank whereby a circulation of the water is had in one direction and for drawing off the water at the bottom and reëntering it at the top whereby the circulation of the water is had in the opposite direction, means for admixing a heating medium with the water while circulating in one direction whereby the temperature of the water is progressively increased, means for admixing a cooling medium with the water as it is circulating in the opposite direction whereby the temperature of the water is gradually decreased, and regulatable means at the sides and ends of the tank for drawing off the surplus water.

9. An apparatus for pasteurizing and cooling beer, comprising a tank adapted to contain a body of water in which bottles containing beer are adapted to be submerged, a plurality of combined perforated supply and draw-off pipes arranged in said tank in close proximity to the bottom thereof, a cover for the tank, a plurality of perforated combined supply and draw-off pipes carried by and depending from the cover, a swiveled conducting pipe attached to the cover and constituting a pivot therefor, means for establishing communication between the conducting pipe and said last mentioned perforated pipes, a conducting pipe communicating with the perforated pipes at the bottom of the tank, means communicating with said conducting pipes for drawing the water off at the top of the tank and reëntering the same at the bottom whereby a circulation of water will be had in one direction and for drawing off the water at the bottom of the tank and reëntering it at the top whereby a circulation of the water will be had in the opposite direction, means for admixing a heating medium with the water while circulating in one direction whereby the temperature of the water is progressively increased, and means for admixing a cooling medium with the water as it circulates in the opposite direction whereby the temperature of the water is gradually decreased.

10. An apparatus for pasteurizing and cooling beer, comprising a tank adapted to contain a body of water in which bottles containing beer are adapted to be submerged, a plurality of combined perforated supply and draw-off pipes arranged in said tank in close proximity to the bottom thereof, a cover for the tank, a plurality of perforated combined supply and draw-off pipes carried by and depending from the cover, a swiveled conducting pipe attached to the cover and constituting a pivot therefor, means for establishing communication between the conducting pipe and said last mentioned perforated pipes, a conducting pipe communicating with the perforated pipes at the bottom of the tank, means communicating with said conducting pipes for drawing the water off at the top of the tank and reëntering the same at the bottom whereby a circulation of water will be had in one direction and for drawing off the water at the bottom of the tank and reëntering it at the top whereby a circulation of the water will be had in the opposite direction, means for admixing a heating medium with the water while circulating in one direction whereby the temperature of the water is progressively increased, means for admixing a cooling medium with the water as it circulates in the opposite direction whereby the temperature of the water is gradually decreased, and means communicating with the sides and ends of the tank at a point below the center thereof for discharging the surplus water.

11. An apparatus for pasteurizing and cooling beer, comprising a tank adapted to contain a body of water in which bottles containing beer are adapted to be submerged, a plurality of combined perforated supply and draw-off pipes arranged in said tank in close proximity to the bottom thereof, a cover for the tank, a plurality of perforated combined supply and draw-off pipes carried by and depending from the cover; a swiveled conducting pipe attached to the cover and constituting a pivot therefor, means for establishing communication between the conducting pipe and said last-mentioned perforated pipes, a conducting pipe communicating with the perforated pipes at the bottom of the tank, means communicating with said conducting pipes for drawing the water off at the top of the tank and reëntering the same at the bottom whereby a circulation of water will be had in one direction and for drawing off the water at the bottom of the tank and reëntering it at the top whereby a circulation of the water will be had in the opposite direction, means for admixing a heating medium with the water while circulating in one direction whereby the temperature of the water is progressively increased, means for admixing a cooling medium with the water as it circulates in the opposite direction whereby the temperature of the water is gradually decreased, and regulatable means communicating with the sides and ends of the tank at a point below the center thereof for discharging the surplus water.

12. An apparatus for pasteurizing and cooling beer, comprising a tank adapted to contain a body of water in which bottles containing beer are adapted to be submerged, a plurality of combined perforated supply and draw-off pipes arranged in said tank in close proximity to the bottom thereof, a cover for the tank, a plurality of perforated combined supply and draw-off pipes carried by and depending from the cover, a swiveled conducting pipe attached to the cover and constituting the pivot therefor, means for establishing communication between the conducting pipe and said last mentioned perforated pipes, a conducting pipe communicating with the perforated pipes at the bottom of the tank, means communicating with said conducting pipes for drawing the water off at the top of the tank and reëntering the same at the bottom whereby a circulation of water will be had in one direction and for drawing off the water at the bottom of the tank and reëntering it at the top whereby a circulation of the water will be had in the opposite direction, means for admixing a heating medium with the water while circulating in one direction whereby the temperature of the water is progressively increased, means for admixing a cooling medium with the water as it circulates in the opposite direction whereby the temperature of the water is gradually decreased, a conducting pipe communicating with the sides and ends of the tank below the center thereof causing a discharge of the surplus water, and a regulatable stand pipe communicating with said conducting pipe for controlling the discharge from the tank of the surplus water.

13. A pasteurizing apparatus of the class described comprising a tank, a cover mounted pivotally thereon, circulating pipes depending from said cover and into the water contained in the tank, and a conducting pipe communicating with the circulating pipes carried by said cover and arranged coaxially with the latter.

14. An apparatus for pasteurizing and cooling beer comprising a tank adapted to contain a body of water in which the bottles are to be submerged, a cover mounted pivotally on the tank, circulating pipes carried by and depending from the cover into the water contained in the tank, and a conducting pipe communicating with said circulating pipes and serving as a pivot about which said cover may turn.

15. An apparatus for pasteurizing and cooling beer in bottles comprising a tank adapted to contain a body of water in which the bottles are to be submerged, a plurality of perforated pipes depending into the upper portion of the tank, perforated distributing pipes arranged in the bottom of the tank, means for supplying heated water to the perforated pipes in the bottom of the tank and withdrawing water through the perforated pipes in the top of the tank, means for supplying a cooling medium to the perforated pipes in the top of the tank and for withdrawing water through the perforated pipes in the bottom of the tank.

In testimony whereof I have hereunto set my hand in presence of two subscribing witnesses.

WILLIAM WENZEL.

Witnesses:
B. J. ZUEHLKE,
LU PAULY.